I. B. SMITH.
ELECTRICAL MEASURING APPARATUS.
APPLICATION FILED APR. 25, 1918.

1,378,983.

Patented May 24, 1921.

INVENTOR
Irving B. Smith
by
Cornelius D. Ehret
his ATTORNEY

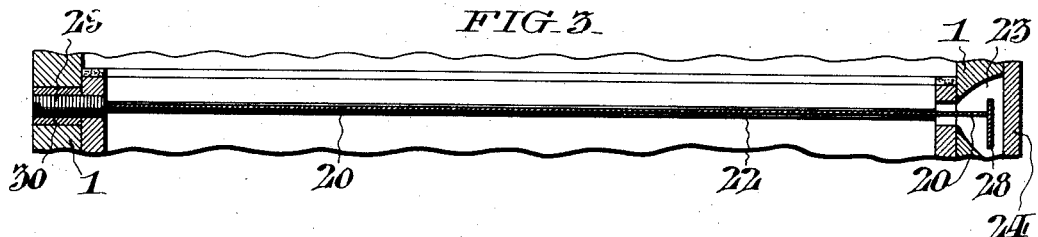
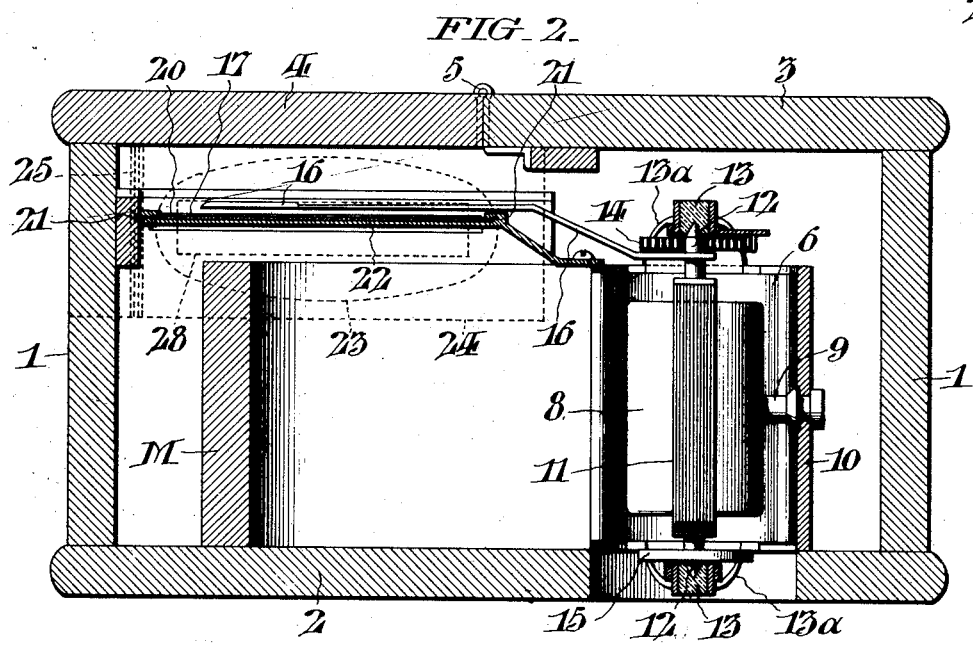
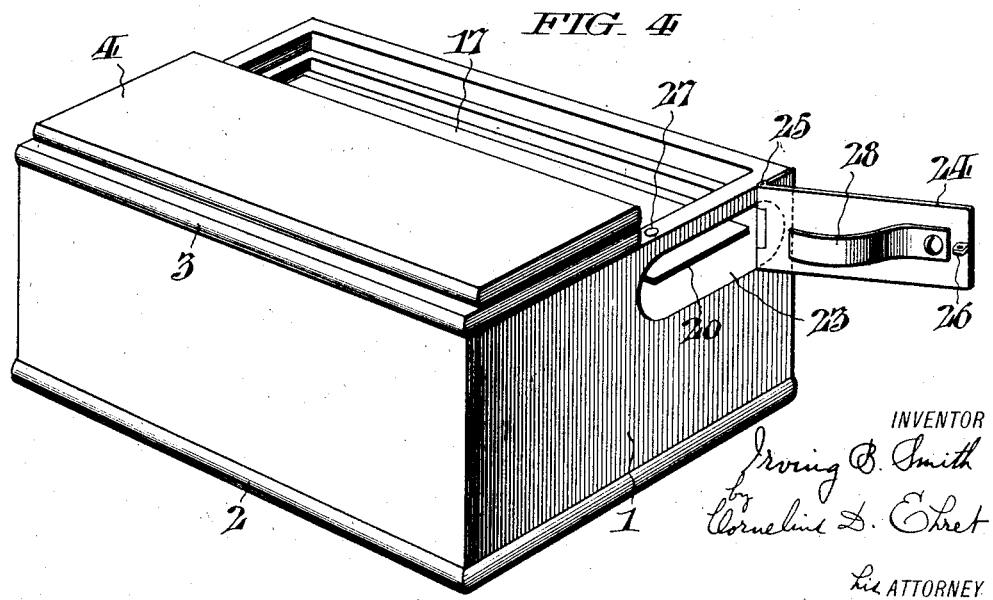

UNITED STATES PATENT OFFICE.

IRVING B. SMITH, OF AMBLER, PENNSYLVANIA, ASSIGNOR TO LEEDS & NORTHRUP COMPANY, OF PHILADELPHIA, PENNSYLVANIA, A CORPORATION OF PENNSYLVANIA.

ELECTRICAL MEASURING APPARATUS.

1,378,983.     Specification of Letters Patent.     Patented May 24, 1921.

Application filed April 25, 1918. Serial No. 230,617.

*To all whom it may concern:*

Be it known that I, IRVING B. SMITH, a citizen of the United States, residing in Ambler, State of Pennsylvania, have invented certain new and useful Improvements in Electrical Measuring Apparatus, of which the following is a specification.

My invention relates to electrical measuring apparatus such as a galvanometer having a member movable in a magnetic field to deflect an index or pointer with respect to a scale, the apparatus being provided with means permitting interchange of scales.

My invention resides in electrical measuring apparatus comprising an electrical measuring instrument, such as a galvanometer, provided with means permitting use of different scales to adapt the instrument for use in different relations, particularly when the scale is calibrated in units other than electrical units of current or voltage, as in cases where the deflection of the instrument is an indication or measure of other quantities.

My invention resides in electrical pyrometric apparatus comprising a galvanometer with interchangeable scales, the scales being calibrated directly in thermal units, such as units of temperature, and particularly when the pyrometric apparatus is of the optical type wherein the brightness of an incandescent lamp filament is matched with the brightness of the body whose temperature is to be determined, the current through the lamp filament being a measure of the temperature, the galvanometer producing a deflection dependent upon the current strength and the deflected pointer coöperating with a scale calibrated in temperature units and correct only for the particular lamp used. Inasmuch as the lamps used in optical pyrometry differ from each other, particularly as to the amount of current through the filament for producing a certain brightness, it is necessary that there be employed for each lamp a scale, if reading in temperature units, corresponding with and correct for that particular lamp. This makes it desirable to allow interchange of scales of the galvanometer so that with a given galvanometer, different scales corresponding to different lamps may be used.

My invention resides in apparatus of the character hereinafter described and claimed.

For an illustration of one of the various forms my invention may take, reference is to be had to the accompanying drawings, in which:

Fig. 2 is a sectional view, some parts in elevation, taken on the line 2—2 of Fig. 1.

Fig. 3 is a fragmentary sectional view taken on the line 3—3 of Fig. 1.

Fig. 4 is a view in perspective of the instrument box or casing partly open.

Figure 1:
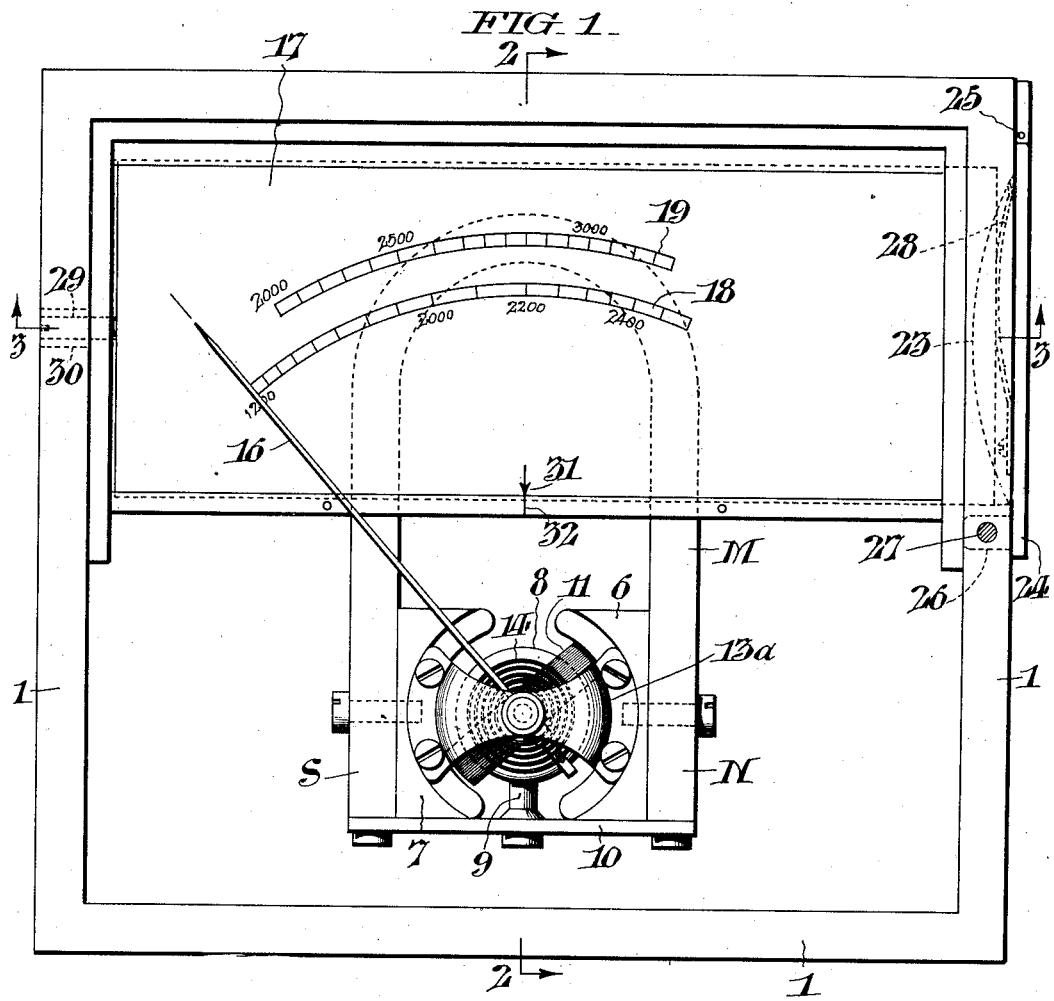
Figure 1 is a plan view of electrical measuring apparatus embodying my invention.

Referring to the drawings, 1 is a casing or box having the bottom 2 and the cover sections 3 and 4, the latter hinged upon the former at 5.

Within the box is disposed a D'Arsonval galvanometer comprising the permanent magnet M whose poles are indicated at N and S. Associated with the magnet poles are the pole pieces 6 and 7 of iron or other suitable magnetizable material between which is disposed the cylindrical iron core 8 held by the member 9, to the support 10. The core 8 is spaced from the pole pieces 6 and 7 to form short air gaps in which is rotatable the rectangular moving coil 11 having the coaxial pivots 12, 12 bearing at their ends in the pivot supports 13, 13 supported in the fixed members 13$^a$. Associated with the upper and lower pivots 12, 12 are the upper and lower flat spiral springs 14 and 15. One end of each of the springs is connected to a pivot 12. The outer ends of the springs are connected to abutments in well known manner, current being led to and from the coil 11 through the spiral springs and the pivots 12, 12 as well understood in the art. Secured to the moving system comprising the movable coil 11 is the index, needle or pointer 16 moved by the coil 11 across the scale card 17 having thereon the scales 18 and 19, in this case calibrated in degrees of temperature. The scale card 17 is secured upon the scale plate 20 which engages in the grooves 21 disposed parallel to each other along the edges of the plate 22 secured in fixed position with respect to the galvanometer.

The box 1 has an opening 23 which is closed by the flap or door 24 hinged at 25 and carrying the lug 26 having a vertical hole through which extends a vertical pin or screw 27 through the upper edge of the box 1.

On the inside of the door or flap 24 is secured the yielding member or leaf spring 28 against which the end of the scale plate 17 engages. A screw 29, threaded in the bushing 30 in the wall of the box 1, engages the other end of the plate 20. By turning the screw 29 the plate 20 is movable with great nicety to the right or left, as viewed in Figs. 1 and 3, to bring a check mark 31 on the scale card 17 into accurate register with a mark 32 on the member 22 or any other part of the instrument in definite or fixed position with respect to the pivotal axis of the coil 11.

Figure 5:
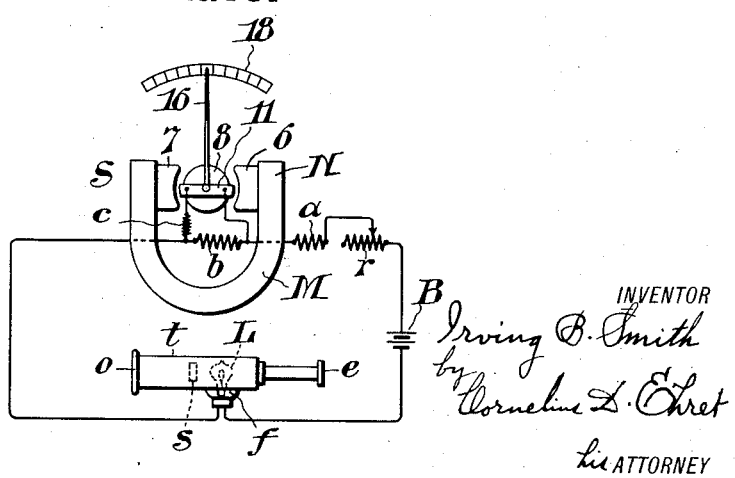
Fig. 5 is a diagrammatic view illustrating optical pyrometric apparatus.

For an illustration of one of the modes of use of a galvanometer provided with the scale structure hereinbefore described, reference may be had to Fig. 5, wherein the galvanometer is employed as an ammeter or milliammeter to produce deflections proportional to or dependent upon the strength of the current passed through the coil 11, the galvanometer being a part of optical pyrometer apparatus. The apparatus comprises the incandescent lamp L disposed within the tube $t$ between the eye-piece $e$ and an objective $o$, in well known manner, the lamp L being held in the lamp socket structure $f$ and having its filament connected in series with a suitable source of current, as a battery B, the resistances $a$, $b$, and adjustable resistance or rheostat $r$. In shunt to the resistance $b$ are connected the coil 11 and the resistance $c$ in series with each other.

As well understood in the art, the instrument comprising the incandescent lamp L is sighted at the incandescent body whose temperature is to be determined, and the rheostat $r$ adjusted to increase or decrease the current through the filament of the lamp L until its brightness matches the brightness of the incandescent body whose temperature is to be determined. There is then a current of certain strength flowing through the coil 11, causing it to deflect with respect to the scale 18, which is preferably calibrated directly in units of temperature, it having been previously determined for the particular lamp L with a similar galvanometer what deflections of the needle 16 of the galvanometer with which the lamp and its scale are to be used will correspond with the different temperatures.

In case the temperature of the incandescent body is so high that a current too great for the filament of the lamp L would have to be passed through it to produce a match in brightness, there may be interposed between the lamp L and the objective $o$ an absorption screen $s$, in which case the incandescent body will appear to have less brightness than when the screen $s$ is absent. With the screen $s$ present, a match in brightness is attained as before by adjusting the rheostat $r$, but in this case the second scale 19 is employed, that scale being calibrated in temperature units and reading in temperatures higher or greater than in the case of the scale 18 for the same deflection of the needle 16.

Inasmuch as it is impossible to make lamps L which are exactly similar to each other, at least to the extent that for equal current strengths equal brightnesses of the filament will result, it is necessary for each lamp L used to provide a scale for the galvanometer, which scale is calibrated for and with respect to the particular lamp used. And inasmuch as the lamps must be from time to time interchanged or renewed, it becomes necessary to have interchangeable scales for the galvanometer or measuring instrument, each lamp and its scale being utilizable with and correct for every other similar galvanometer having the same quantitative characteristics as the one by which that scale was calibrated in conjunction with its particular lamp.

By the structure hereinbefore described, it is possible to have for each lamp L a scale reading in temperature units referring and belonging to it, and the different scales for the different lamps may be readily inserted and removed. When a scale plate 20 is inserted into the slots in the plate 22, it is introduced from the right, Fig. 1, through the opening 23, until its left end abuts the screw 29, which has been more or less adjusted toward the left. The door 24 is then closed with the spring 28 against the right end of the plate 20, and the door is then held in position by insertion of the screw 27 through the lug 26. The screw 29 is then adjusted to bring the mark 31 into exact register with the mark 32. When this adjustment is attained, the readings of the instrument will be correct for the particular lamp L to which the scale belongs.

While I have herein more particularly described optical pyrometric apparatus, it will be understood that my invention is applicable broadly to measuring apparatus comprising a galvanometer used in association with interchangeable devices or elements each of which requires a special scale for the galvanometer, the scale markings being dependent upon constants or characteristics of both the galvanometer and the associated device or element.

What I claim is:

1. Measuring apparatus comprising a galvanometer having a deflecting pointer carried by its movable member and a scale holder over which said pointer deflects, means having a characteristic variable in accord with the unknown quantity to be measured, variation of said characteristic being accompanied by deflection of said pointer to correspond with said unknown quantity, said unknown quantity being other than electrical in nature, a scale for said galvanometer adapted to be held by said scale holder and reading directly in units of said quantity to be measured, the markings of said scale being dependent upon the characteristics of said galvanometer and the particular said means, and means for relating said scale to said holder in such position that a deflection of said pointer indicates a scale reading of said unknown quantity.

2. Pyrometric apparatus comprising a galvanometer having a deflecting pointer carried by its movable member and a scale holder over which said pointer deflects, means having a characteristic variable in accord with temperature changes, variation of said characteristic being accompanied by deflection of said pointer to correspond with the temperature, a scale for said galvanometer adapted to be held by said scale holder and reading directly in units of temperature, the markings of said scale being dependent upon the characteristics of said galvanometer and the particular said means, and means for relating said scale to said holder in such position that deflections of said pointer indicate directly the temperatures according with the variations of the characteristic of said first named means.

3. Optical pyrometric apparatus comprising a galvanometer having a deflecting member actuated by its movable member and a scale holder, a circuit, an incandescent lamp standard associated with said circuit and galvanometer, means for varying the brightness of said lamp standard and thereby varying the deflection of said deflecting member, a scale for said galvanometer calibrated in temperature units and corresponding with the particular said lamp standard, and means for relating said scale to said holder in such position that deflections of said deflecting member indicate directly the temperatures according with the variations in brightness of said lamp standard.

4. The combination with a galvanometer, interchangeable means adapted to coöperate with said galvanometer to determine the deflection thereof, interchangeable scales for said galvanometer, each scale corresponding with a particular one of said means and having markings dependent upon variations of a characteristic of said means variable in accord with the unknown quantity to be measured, and means for holding said interchangeable scales in predetermined relation with respect to the moving system of said galvanometer.

5. Optical pyrometric apparatus comprising a galvanometer, interchangeable incandescent lamps adapted to be associated with said galvanometer, interchangeable scales for said galvanometer, each scale calibrated in temperature units and having markings dependent upon different degrees of brightness of a particular one of said lamps, and means for holding said interchangeable scales in predetermined position with respect to the moving system of said galvanometer.

6. Measuring apparatus comprising a galvanometer having a deflecting pointer carried by its movable member and a scale holder over which said pointer deflects, means having a characteristic variable in accord with the unknown quantity to be measured, variation of said characteristic being accompanied by deflection of said pointer to correspond with said unknown quantity, said unknown quantity being other than electrical in nature, a scale for said galvanometer adapted to be held by said scale holder and reading directly in units of said quantity to be measured, the markings of said scale being dependent upon the characteristics of said galvanometer and the particular said means, and means for adjusting said scale on said scale holder transversely of said deflecting pointer to bring the scale markings into predetermined position with respect to said pointer.

7. Optical pyrometric apparatus comprising a galvanometer, interchangeable incandescent lamps adapted to be associated with said galvanometer, interchangeable scales for said galvanometer, a scale holder in fixed relation with respect to said galvanometer, each scale calibrated in temperature units and having markings dependent upon different degrees of brightness of a particular one of said lamps, a positioning mark on each of said scales, a mark on said scale holder, and means for adjusting each of said scales with respect to said holder to bring the positioning mark thereon into register with said mark on said holder.

In testimony whereof I have hereunto affixed my signature this 24th of April, 1918.

IRVING B. SMITH.